United States Patent [19]

Hilliard et al.

[11] 4,216,047

[45] Aug. 5, 1980

[54] NO-BLEED CURING OF COMPOSITES

[75] Inventors: Lonnie G. Hilliard, Kent; Michael J. Sibborn, Bellevue, both of Wash.

[73] Assignee: Boeing Commercial Airplane Company, Seattle, Wash.

[21] Appl. No.: 943,253

[22] Filed: Sep. 15, 1978

[51] Int. Cl.² ............................................. B29C 17/00
[52] U.S. Cl. ..................... 156/285; 156/286; 156/289; 156/323; 156/330; 156/307.5
[58] Field of Search ............. 156/382, 245, 285, 286, 156/288, 289, 323, 330, 331, 309

[56] References Cited

U.S. PATENT DOCUMENTS

| 2,805,974 | 9/1957 | Brucker | 156/286 |
| 3,072,225 | 1/1963 | Cremer et al. | 156/382 |
| 3,666,600 | 5/1972 | Yoshino | 156/285 |
| 3,703,422 | 11/1972 | Yoshino | 156/286 |
| 3,960,635 | 6/1976 | La Roy et al. | 156/286 |
| 4,065,340 | 12/1977 | Dickerson | 156/286 |

FOREIGN PATENT DOCUMENTS 210766  10/1957  Australia .................................. 156/285

Primary Examiner—Jerome W. Massie
Attorney, Agent, or Firm—Morris A. Case; Bernard A. Donahue

[57] ABSTRACT

A composite structure is prepared in a mold using a vacuum bag with an edge breather separated from a layup to be formed into a composite. A means of communication between the edge breather and the layup provides a path for air being drawn from the layup and to provide a path that closes off and prevents excess resin flow from the layup as it cures.

12 Claims, 4 Drawing Figures

NO-BLEED CURING OF COMPOSITES

BACKGROUND OF THE INVENTION

It is known to use a vacuum bag molding process to pressurize while heat curing a composite structure. To obtain a quality part it is necessary to remove all the trapped air from a layup being formed into the part, however, the path for removal of air also provides a path for excessive amounts of resin to flow during the cure cycle. In U.S. Pat. No. 3,703,422 a vacuum bag molding process is shown with layers of glass cloth communicating between a vacuum source and bleeder layers covering a panel being formed. The layers of glass cloth not only provide a path for removal of air, but also a path for resin to bleed or flow into when the resin viscosity is lowered during the cure cycle. In another known method a porous parting layer covers the layup and the parting layer in turn is covered by a glass cloth layer. The glass cloth layer acts as a bleeder to remove air, however, during the heating cycle excess resin bleeds into the glass cloth layer. The cure cycle is accomplished in two steps. After the vacuum is applied the unit is first heated up to a temperature where the resin begins to gel and is held at that temperature for a time to partially cure the resin and prevent excessive run off. Next pressure is applied to the outside of the vacuum bag and the temperature raised to and held at the cure temperature for a time sufficient to cure the resins. Even with this controlled rate of resin run off the resin lost into bleeder layers often amounts to 25% or more and varies with different resins and different suppliers' resins. To obtain the desired resin to fiber percentage in the finished product one provides an excess of resin for run off and tries to control the amount of the run off.

It was found that non-bleed vacuum bag molding can be accomplished wherein the air is completely removed from a layup, but the breather means closes off when resin starts to flow into it, and the cure is accomplished in one step instead of two steps.

SUMMARY OF THE INVENTION

Vacuum bag molding of composite structures with a breather strip or tape to which a vacuum is applied is spaced away from a layup of the composite and uses a strand of fibers to communicate between the layup and breather strip. The pressurized layup is raised to temperature and cured. The resin trying to pass through the strand quickly sets up in the strand to close off the flow of resin and prevent bleeding.

It is an object of this invention to prevent bleeding of resin during bag mold curing of the resin in a layup.

It is another object to closely control resin to fiber percentages in a composite structure by preventing bleeding of the resin.

It is yet another object of this invention to provide a method of curing a composite structure without requiring variations in method due to different flow characteristics of different vendors' resins.

DETAILED DESCRIPTION

Figure 1:
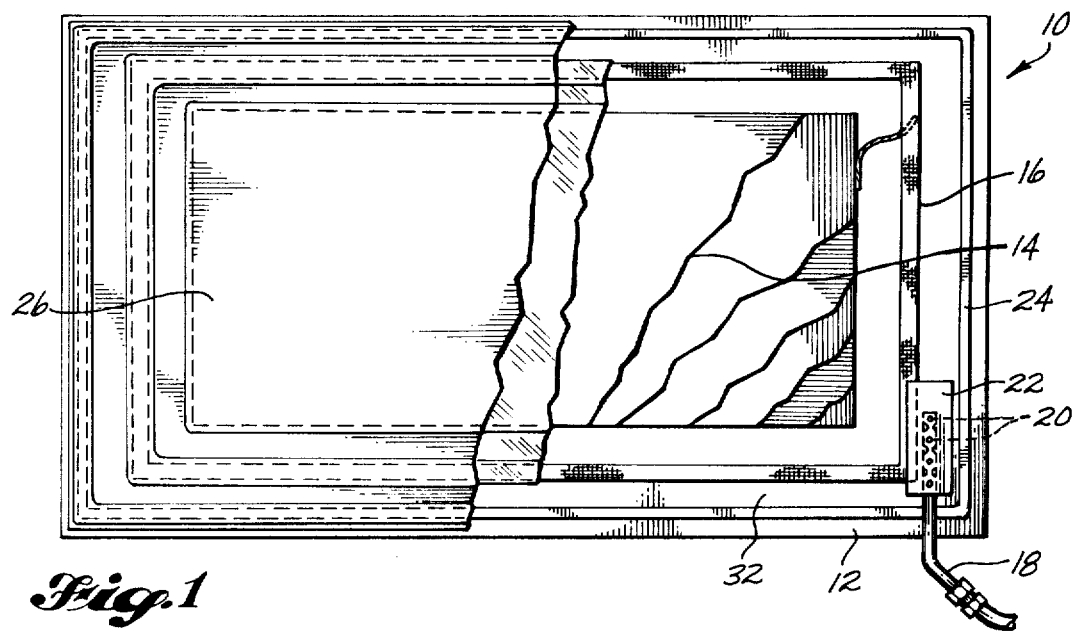
FIG. 1 shows a plan view of apparatus used in this invention.
Figure 2:
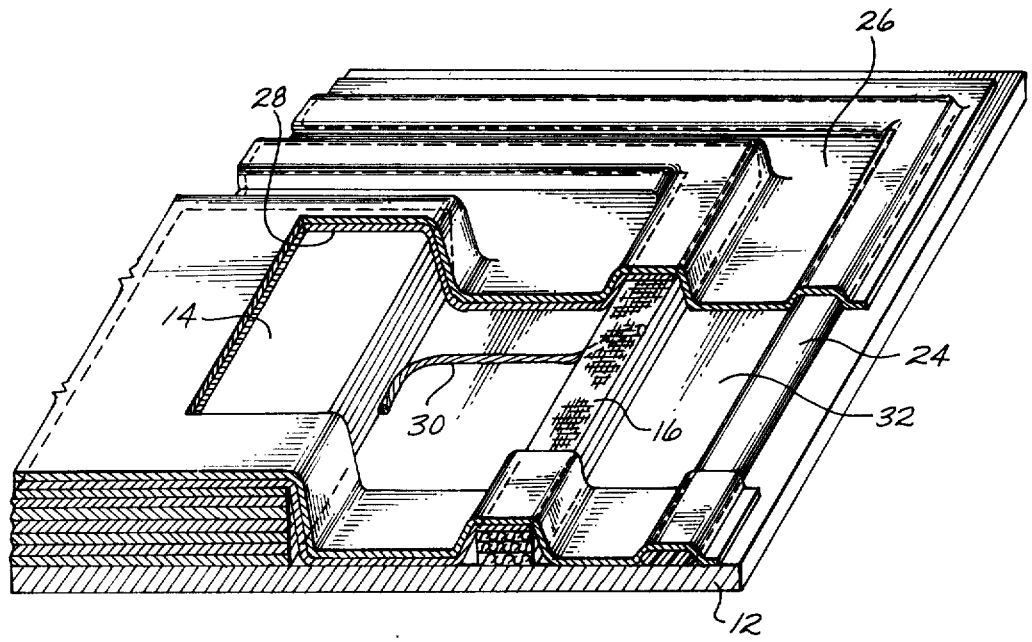
FIG. 2 shows a fragmented perspective view of one embodiment of this invention.

The vacuum bag set up 10 of this invention uses a mold or platen 12 upon which a part is formed. In FIGS. 1 and 2 the part or layup 14 is a laminate made up of several layers of a fiber reinforced resin. In a preferred embodiment the layup will be prepared of graphite fibers as the reinforcement and an epoxy resin as the bonding agent. It is not desired to limit the layup to those materials, however, as other reinforcing fibers such as glass, boron, or kevlar may be used and other resins such as a polyester may be used to name a few of the materials. An edge strip or tape 16 of a breather material is located on the mold and is spaced away from the layup with a minimum distance of at least $\frac{1}{8}''$ preferred. The breather material is preferably layers of glass cloth or fibers, however, other materials may be used such as polyester cloth or fibers. A tube 18 having perforations 20 is placed over the breather strip and covered with porous tape 22. The tube is connected to a vacuum source not shown to provide a means of introducing suction from the vacuum into the edge breather strip. A sealing strip 24 of a putty like material having an adhesive is placed adjacent the outer periphery of the mold to act as a seal for vacuum bag 26. An impervious film of "Teflon" 28 which may be either tetrafluoroethylene or fluorinated ethylene propylene acts as a parting agent and is located over the layup and the edge breather. A strand of fibers 30 is located to communicate between the layup and the edge breather strip. This strand is preferably of glass, however, it may also be of other fibers that can withstand the heat and pressure of the process without closing off the multitude of air passages provided by the strand. This strand serves a dual purpose. It acts as a channel for the passage of gasses passing from the layup into the breather strip, but acts as a stop off when resin tries to flow over the same strand pathways.

When preparing a laminated composite the surface 32 of mold or platen 12 is covered with a release agent and the strand of glass fibers 30 placed on the platen. The layers of graphite reinforcing fibers in an epoxy resin making up the layup 14 is placed on the platen and in contact with the strand. Next the breather strip 16 of glass fibers is placed on the platen in contact with the strand of fibers 30 but spaced away from the layup. The tape 20 and tubing 18 is placed on the breather layer. A Teflon parting film 28 is located to cover the layup and extend over the breather strip, the sealing strip put in position and the vacuum bag 26 put in position. As the vacuum is introduced into the edge breather strip and the air evacuated, the bag follows the contour of the various parts which introduces pressure against the layup and seals off contact between the layup and the breather strip except for the strand of fiber. Air is pulled from the layup through said strand. The platen with assembly is placed in an autoclave not shown and pressure introduced to the outside of the bag, the pressure raised up to about 85 p.s.i., and at the same time the temperature is raised to the cure temperature for the resin which in this case is about 355° F. and kept at that temperature until the resin completely cures, which in this case is about two hours. It is preferred that the vacuum to the edge breather strip be vented to atmosphere when the outside pressure reaches about 20 p.s.i. As the epoxy heats up it first becomes quite liquid and flows to give uniform distribution to the layup. At the same time the liquid resin is pulled through the strand of fiber, but before the resin reaches the end of the strand the resin gels to close off the strand and prevent bleeding of resin from the layup.

Figure 3:
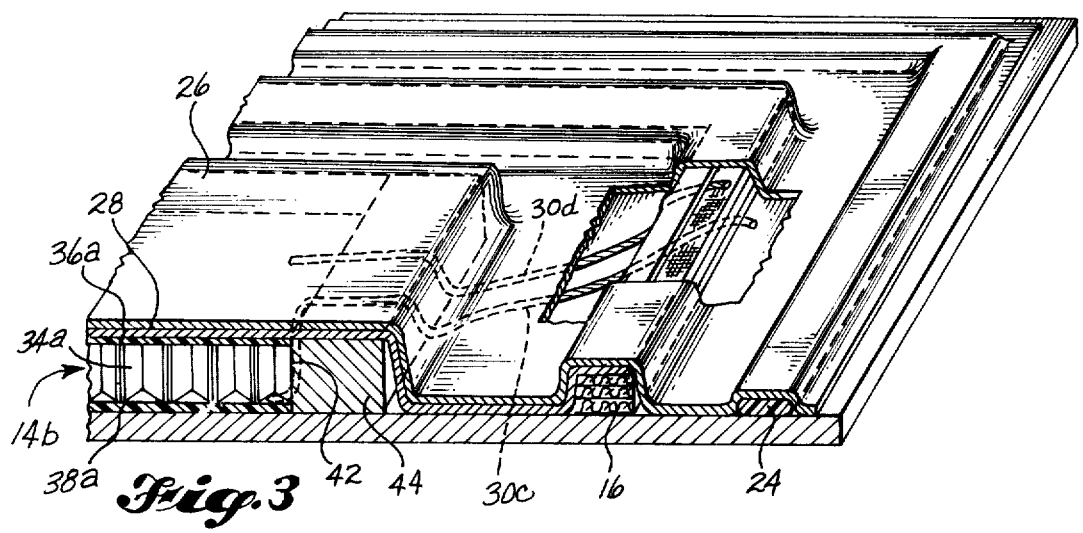
FIG. 3 shows a fragmented perspective view of another embodiment of this invention.
Figure 4:
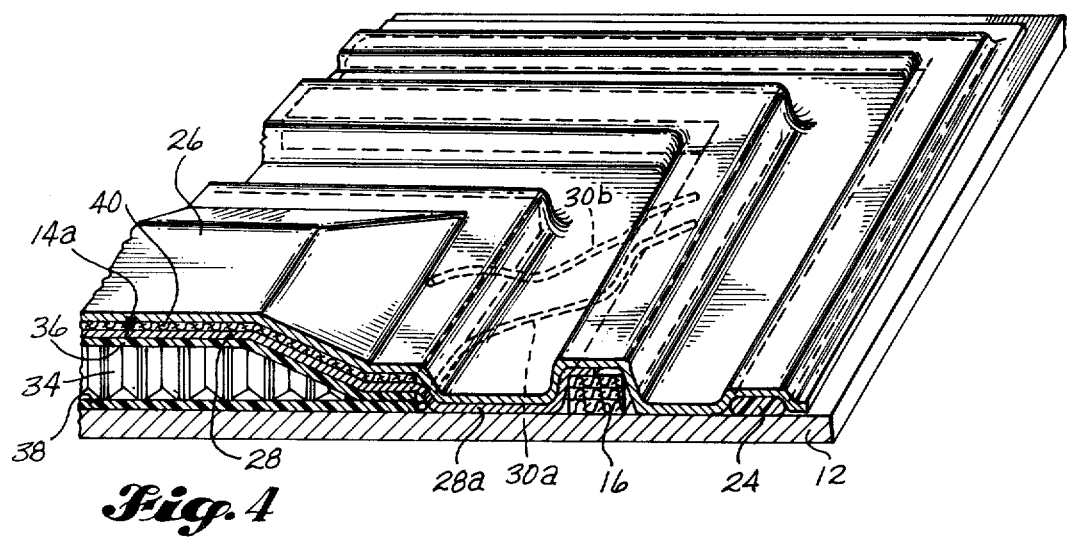
FIG. 4 shows a fragmented perspective view of yet another embodiment.

If the layup is contoured such as is the case in the embodiment shown in FIG. 4, additional breather paths are supplied to allow the bag to closely follow the contour of the layup. In that Figure as well as in FIG. 3 the same parts will be identified with the same numbers as previously used. In FIG. 4 the layup 14a is made up of honeycomb core 34, is covered on the top face with a layer 36 and the bottom face with a layer 38, and each layer has an epoxy adhesive adjacent to the face and is then covered with graphite reinforced epoxy resin layers. The honeycomb core is reduced in thickness and tapers downward toward the edges and the facing layers are joined together around the edge. A breather layer of glass fibers 40 extends over the layup and is located between the vacuum bag 26 and the impervious parting layer 28a which in this embodiment covers the layout and extends about halfway over the edge breather layer 16. A strand of glass fibers 30a extends from the joined face layers 36 and 38 to the edge breather strip 16. A second strand 30b of glass fibers extends from the cover breather layer 40, between parting film 28 and vacuum bag 26 to control edge breather strip 16. This strand supplied a path for air to be evacuated from the bag to permit the bag to closely follow the layup regardless of the contour.

FIG. 3 shows yet another embodiment where a layup 14b has a honeycomb core 34a with face layers 36a and 38a. In this embodiment the edge 42 of the layup is square and is formed by placing a frame 44 on the platen 12 and abutting the layup against the frame. A strand 30c of fiberglass is located to contact face layer 38a, pass over the frame and contact the edge breather strip 16, and a second strand 30d of fiberglass is located to contact face layer 36a, pass over the frame and extend to contact edge breather strip 16. These strands each provide a channel for evacuation of air from the layup and a stop off means to prevent resin bleeding when the layup is being cured under heat and pressure.

In the embodiments where the layup includes a honeycomb core the procedure for curing the resin to form the composite is also a one step process. When the assembly is completed a vacuum is introduced into the edge breather strip, pressure introduced on the outside of the vacuum bag, and the temperature raised to curing temperature and held at that temperature until the resin is cured. The pressure on the outside of the bag is preferably raised to only about 45 p.s.i. for the honeycomb containing layup, but again it is preferred to exhaust the vacuum line to atmosphere when the outside pressure reaches about 20 p.s.i.

We claim:

1. A method of making a composite structure with steps comprising: applying parting means to a mold, placing a layup including uncured resin on a mold with said layup to be formed into a composite structure, locating a tape of breather material on the mold with said tape spaced away from the layup, placing a strand of fibers defining a multitude of passages to communicate between the layup and the tape, covering the layup with an impervious flexible film that acts as a release material, covering the layup strand and tape with a vacuum bag, introducing a vacuum in the tape and pulling air from the layup through passages in the strand and into the tape to exhaust air from the layup and from the bag, applying pressure to the outside of the bag, effecting a one step cure of the layup by heating up to and maintaining resin curing temperature while maintaining the pressure, gelling the resin thereby closing off the resin as it starts to flow through the strand and curing the resin to form a composite structure, and selecting materials for the strand from materials capable of withstanding the heat and the pressure of the process without closing off the multitude of air passages.

2. A method as in claim 1, with further steps comprising venting the vacuum from the tape to atmosphere when the pressure on the outside of the bag reaches about 20 p.s.i.

3. A method as in claim 1, with further steps comprising: extending the flexible release film to extend part way over the tape, placing a layer of breather material over the area of the layup but between the flexible release film and the vacuum bag, and placing another strand of fibers defining a multitude of passages to communicate between the breather layer and the breather tape.

4. A method as in claim 1 with further steps comprising: placing a frame on the mold with said frame located to be abutted by the layup to define the edge of the layup, and placing a second strand of fibers defining a multitude of passages over the frame with the second strand also communicating between the layup and the breather tape.

5. A method as in claim 4 with further steps comprising: extending the flexible release film to extend part way over the tape, placing a layer of breather material over the area of the layup but between the flexible release film and the vacuum bag, and placing another strand of fibers defining a multitude of passages to communicate between the breather layer and the breather tape.

6. A method of making a composite structure with steps comprising: applying parting means to a mold, placing a fiber reinforced resin layup on the mold, locating parting means over the layup, laying a strip of breather material on the mold with the breather strip located out of contact with the layup, providing a path for removing of air from the layup and closing off of resin flow from the layup by placing a strand of fibers defining a multitude of passages for communicating between the layup and the breather strip, covering the layup strand and tape with a vacuum bag, applying a vacuum in the breather strip pulling air from the layup through the strand and exhausting the air from the vacuum bag, introducing pressure to the outside of the vacuum bag, introducing one step resin curing by heating upto and maintaining resin curing temperature while maintaining the pressure, gelling thereby closing off the resin as it starts to flow through the strand and forming a composite structure by curing the resin in the layup, and selecting materials for the strand from materials capable of withstanding the heat and the pressure of the process without closing off the multitude of air passages.

7. A method of making a composite structure as in claim 6, with steps further comprising placing the breather strip at least one half inch away from the layup.

8. A method of making a composite structure as in claim 6, with further steps comprising: applying a layer of breather material between the parting means over the layup and the vacuum bag, and placing a second strand of fibers defining a multitude of passages to communicate between the layer of breather material and the breather strip.

9. A method of making a composite structure as in claim 6, with further steps of selecting graphite fiber reinforced epoxy resin for the layup, applying a pressure of about 85 to 100 p.s.i. to the outside of the vacuum bag and a temperature of about 345° F. to 365° F., and venting the vacuum bag to atmospheric pressure when the outside pressure reaches about 20 p.s.i.

10. A method of making a composite structure with steps comprising: applying parting means to a mold, placing a frame on the mold, preparing a layup to abut the frame with the layup of a honeycomb core with face covering of fiber reinforced resins, locating parting means over the layup and frame, laying a strip of breather material on the mold with the breather strip located out of contact with the layup, providing a path for removal of air from the layup and closing off resin flow from the layup by placing a pair of strands of fibers each strand defining a multitude of passages for communicating between the layup and the breather strip with one strand communicating with one face of the layup and the second strand communicating with the second face of the layup, covering the layup strands and breather strip with a vacuum bag, applying a vacuum in the breather strip and pulling air from the layup through the strands and exhausting the air from the vacuum bag, introducing pressure to the outside of the vacuum bag, introducing one step resin curing by heating upto and maintaining the resin curing temperature while maintaining the pressure, gelling thereby closing off the resin as its starts to flow through the strand and forming a composite structure by curing the resin in the layup, and selecting materials for the strand from materials capable of withstanding the heat and the pressure of the process without closing off the multitude of air passage.

11. A method of making a composite structure as in claim 10, with further steps comprising: applying a layer of breather material over the layup and between the parting means and the vacuum bag, and placing a third strand of fibers defining a multitude of passages to communicate between the layer of breather material and the breather strip.

12. A method of making a composite structure with steps comprising: applying parting means to a mold, preparing a layup of a honeycomb core with face covering of fiber reinforced resins and the honeycomb core to taper down around the edges and the face coverings joined to each other around the edges, locating parting means over the layup, placing a layer of breather material over the parting means, laying a strip of breather material on the mold with the breather strip located out of contact with the layup, providing a path for removing air from the layup and closing off resin flow from the layup by placing a strand of fibers defining a multitude of passages for communicating between the layup and the breather strip, placing a second strand of fibers defining a multitude of passages to communicate between the layer of breather material and the breather strip, covering the layer of breather material, the breather strip and the strands with a vacuum bag, applying a vacuum in the breather strip and pulling air from the layup and the breather layer through the strands while exhausting the air from the vacuum bag, introducing pressure to the outside of the vacuum bag, introducing one step resin curing by heating upto and maintaining resin curing temperature while maintaining the pressure, gelling thereby closing off the resin as it starts to flow through the strand and forming a composite structure by curing the resin in the layup, and selecting materials for the strand from materials capable of withstanding the heat and the pressure of the process without closing off the multitude of air passages.

* * * * *